United States Patent [19]
Girard et al.

[11] Patent Number: 5,751,282
[45] Date of Patent: May 12, 1998

[54] SYSTEM AND METHOD FOR CALLING VIDEO ON DEMAND USING AN ELECTRONIC PROGRAMMING GUIDE

[75] Inventors: Michel Girard; Keith Rowe, both of Seattle; Joseph H. Matthews, III, Redmond; Frank Lawler, Seattle, all of Wash.

[73] Assignee: Microsoft Corporation, Redmond, Wash.

[21] Appl. No.: 490,064

[22] Filed: Jun. 13, 1995

[51] Int. Cl.⁶ .................................................. G06F 3/00
[52] U.S. Cl. ....................................... 345/327; 395/899
[58] Field of Search .......................... 395/800, 899; 345/327, 328, 156, 961; 348/5, 7, 12

[56] References Cited

U.S. PATENT DOCUMENTS

| | | | |
|---|---|---|---|
| 4,081,754 | 3/1978 | Jackson | 325/396 |
| 4,203,130 | 5/1980 | Doumit et al. | 358/1 |
| 4,228,543 | 10/1980 | Jackson | 358/191.1 |
| 4,694,490 | 9/1987 | Harvey et al. | 380/20 |
| 4,704,725 | 11/1987 | Harvey et al. | 380/9 |
| 4,706,121 | 11/1987 | Young | 358/142 |
| 4,751,578 | 6/1988 | Reiter et al. | 358/183 |
| 4,908,713 | 3/1990 | Levine | 358/335 |
| 4,977,455 | 12/1990 | Young | 358/84 |
| 5,038,211 | 8/1991 | Hallenbeck | 358/142 |
| 5,068,734 | 11/1991 | Beery | 358/191.1 |
| 5,151,789 | 9/1992 | Young | 358/194.1 |
| 5,233,654 | 8/1993 | Harvey | 380/20 |
| 5,307,173 | 4/1994 | Yuen et al. | 358/335 |
| 5,335,079 | 8/1994 | Yuen et al. | 358/335 |
| 5,335,277 | 8/1994 | Harvey et al. | 380/20 |
| 5,353,121 | 10/1994 | Young et al. | 348/563 |
| 5,442,390 | 8/1995 | Hooper | 348/7 |
| 5,479,266 | 12/1995 | Young et al. | 358/335 |
| 5,479,268 | 12/1995 | Young et al. | 358/335 |
| 5,530,754 | 6/1996 | Garfinkle | 380/5 |
| 5,568,180 | 10/1996 | Okamoto | 348/7 |
| 5,581,479 | 12/1996 | McLaughlin | 364/514 A |
| 5,583,561 | 12/1996 | Baker | 348/7 |
| 5,583,937 | 12/1996 | Ulrich | 380/20 |
| 5,594,794 | 1/1997 | Eyer | 380/20 |
| 5,619,247 | 4/1997 | Russo | 348/3 |
| 5,619,249 | 4/1997 | Billock | 348/7 |
| 5,629,733 | 5/1997 | Youman | 348/7 |
| B1 4,706,121 | 12/1993 | Young | 358/142 |

Primary Examiner—Eric Coleman
Attorney, Agent, or Firm—Lee & Hayes, PLLC

[57] ABSTRACT

An interactive television system has a centrally located head end server coupled to service multiple, remotely located set-top boxes. Each set-top box runs an electronic programming guide that provides an on-screen program grid listing program titles in relation to their scheduled viewing times and channel numbers. The viewer is permitted to scroll through the program grid to list titles of past, current, and future programs. A database, resident at the head end server, supplies the program titles and scheduled viewing times of the past, current, and future programs to the electronic programming guide. The head end server transmits real-time video data streams of the available programs to the EPG. A continuous media server, resident at the head end server, stores the video data streams to build a reserve of previously played programs. The media server can also store video preview clips of future programs. When a viewer selects a current program, the real-time video data stream of the current program is displayed by the set-top box. When the viewer selects a past program, the head end server retrieves a stored video data stream of the selected past program and transmits it to the set-top box. When the viewer selects a future program, the head end server retrieves a stored video preview clip of the future program and transmits it to the set-top box.

20 Claims, 7 Drawing Sheets

SQL DATABASE — 90

| STORAGE POINTER | PROGRAM TITLE | ACTOR | CLOSED CAPTION | STEREO | TIME | NETWORK | CATEGORY | DESCRIPTOR |
|---|---|---|---|---|---|---|---|---|
| PROG1 | MATLOCK | GRIFFITH | YES | YES | 8:00 pm THU | ABC | DRAMA | DESCRIPTOR1 |
| PROG2 | SEINFELD | SEINFELD | YES | YES | 9:00 pm THU | NBC | COMEDY | "The Chinese Woman", George's... |

FIG. 4

SYSTEM AND METHOD FOR CALLING VIDEO ON DEMAND USING AN ELECTRONIC PROGRAMMING GUIDE

TECHNICAL FIELD

This invention relates to an interactive television system which permits a viewer to use an electronic programming guide to select current programs, video on demand of past programs, and previews of future programs. This invention also relates to methods for calling video on demand using an electronic programming guide and for operating such interactive televisions systems.

BACKGROUND OF THE INVENTION

Television viewers are very familiar with printed programming schedules that appear in daily newspapers or weekly magazines, such as TV Guide®. The printed program guide lists the various television shows in relation to their scheduled viewing time on a day-to-day basis. An electronic programming guide is essentially an on-screen version of this printed program guide. The electronic programming guide is carried by a separate, dedicated channel and provides an on-screen list of various programs in relation to their scheduled viewing times. The program information is provided in a grid format where the program titles are organized horizontally with respect to their associated stations and vertically with respect to their scheduled viewing times.

Conventional electronic programming guides are strictly time-based. They list only the titles of programs that are currently being broadcast and a limited amount of future programming (for example, the next one to two hours of programming). A viewer is limited to watching the programs being broadcast at the current time. If the viewer missed a program, there is no opportunity to go back and view it (unless, of course, the viewer remembered to recorded it).

Some hotels offer services called "video on demand" which permit scheduled viewing of recently released movies. One type of video on demand service provides a limited list of movie titles (e.g., six to seven movies) and the start times at which they show. For instance, a movie might run every two hours. The movie signals are received via conventional cable or satellite techniques and retransmitted to the television sets within the hotels. The viewer must coordinate their personal schedule to coincide with the program schedule if he/she wishes to see the whole movie. Otherwise, the viewer can select the movie and watch any remaining portion of it. A fee is charged upon selection. Examples of this type of service include Pay Per View® and Preview®. This type of video on demand service has the same drawbacks as conventional electronic programming guide systems in that the viewer is held to the inflexible schedule dictated by the service.

Another type of video on demand service offered in some hotels is a VCR-based system. It allows a limited number of users to select from a limited supply of movies at any time. VCR cassettes and players are typically resident at the hotel. When a viewer selects a movie, the VCR cassette is loaded into a player and the signal sent to the viewer's room. This system has a drawback in that it is not unconditional video on demand. The VCR-based service cannot accommodate multiple viewers desiring to watch the same movie at different times, once the limited number of VCR cassettes for that movie have been exhausted.

It would be desirable to develop an interactive television system which affords the conveniences of an on-screen electronic programming guide and the flexibility of true video on demand services.

SUMMARY OF THE INVENTION

According to one aspect of this invention, an interactive television system comprises a centrally located head end server coupled to service multiple, remotely located set-top boxes. Each set-top box runs an electronic programming guide (EPG) that provides an on-screen program grid that lists program titles in relation to their scheduled viewing times and channel numbers. The viewer can scroll through the program grid, backward and forward, or up and down, to review past, current, and future programs. A database, resident at the head end server, supplies the program titles and scheduled viewing times of the past, current, and future programs to the electronic programming guide as the viewer scrolls through the menu.

The head end server transmits to the EPG all real-time video data streams of the available programs. A continuous media server, resident at the head end server, stores the video data streams to maintain a reserve of previously played past programs. The media server can also store video preview clips of future programs. The video data streams are stored digitally in a disk array in mapped locations. The locations of the video data streams are kept in a database and each video data stream can be accessed through pointers to the disk.

When a viewer selects a current program, the head end server supplies the real-time video data stream of the current program to the set-top box. When the viewer selects a past program, the database provides a pointer to a location in the disk array that is associated with the selected past program. The continuous media server uses the pointer to retrieve a video data stream of the selected past program and supplies the video data stream to the set-top box. When the viewer selects a future program, the database provides the appropriate memory pointer and the continuous media server retrieves a video preview clip of the future program and supplies it to the set-top box.

According to other aspects of this invention, methods for operating the interactive television system to call video on demand using an electronic programming guide are also provided.

BRIEF DESCRIPTION OF THE DRAWINGS

FIG. 7 is a flow diagram of a preferred method for choosing to view a past program.

DETAILED DESCRIPTION OF THE PREFERRED EMBODIMENTS

Figure 1:
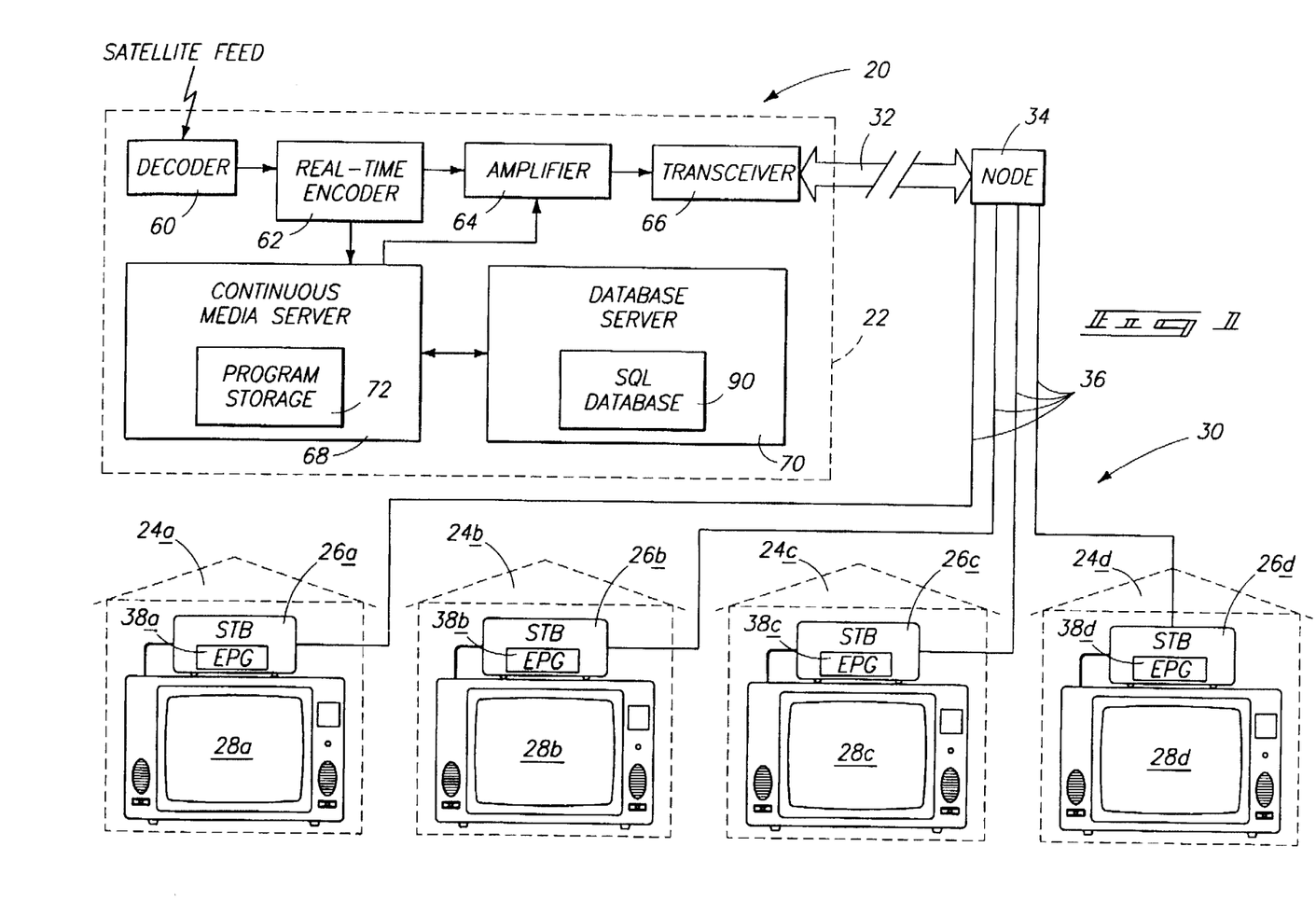
FIG. 1 is a block diagram of an interactive television system according to this invention.

FIG. 1 shows an interactive television system 20 according to this invention. Interactive television system 20 includes a centralized head end server 22 which is configured to provide television programming service to multiple homes, of which representative homes 24a–24d are shown. A single head end server 22 might be designed, for example, to service 250,000 homes. Each home 24a–24d is depicted for explanation purposes as having at least one set-top box (STB) 26a–26d coupled to at least one television (TV) 28a–28d. The set-top boxes receive the video signals from the head end server and control which programs are displayed on their associated televisions.

Head end server 22 is interconnected to the end viewers' homes 24a–24d via a multi-tier distribution structure 30. Distribution structure 30 includes a high speed, high bandwidth fiber optic cable network 32 coupled to regional distribution nodes (represented by distribution node 34). The speed and bandwidth of the fiber optic cable affords the desired performance for supporting a fully interactive television system. Each distribution node 34 is connected to multiple STBs 26a–26d via conventional home entry lines 36, such as twisted-pair lines or coaxial cable. As an example, each distribution node 34 supports approximately 1200 homes.

Each STB 26a–26d is configured to run an electronic programming guide (EPG) 38a–38d. An electronic programming guide provides an on-screen listing of various program titles correlated to corresponding scheduled viewing times. The listing is organized in a predetermined arrangement that is displayed on the television. The EPG might also include other program descriptive information, including whether the program is provided in closed caption or stereo.

Figure 2:
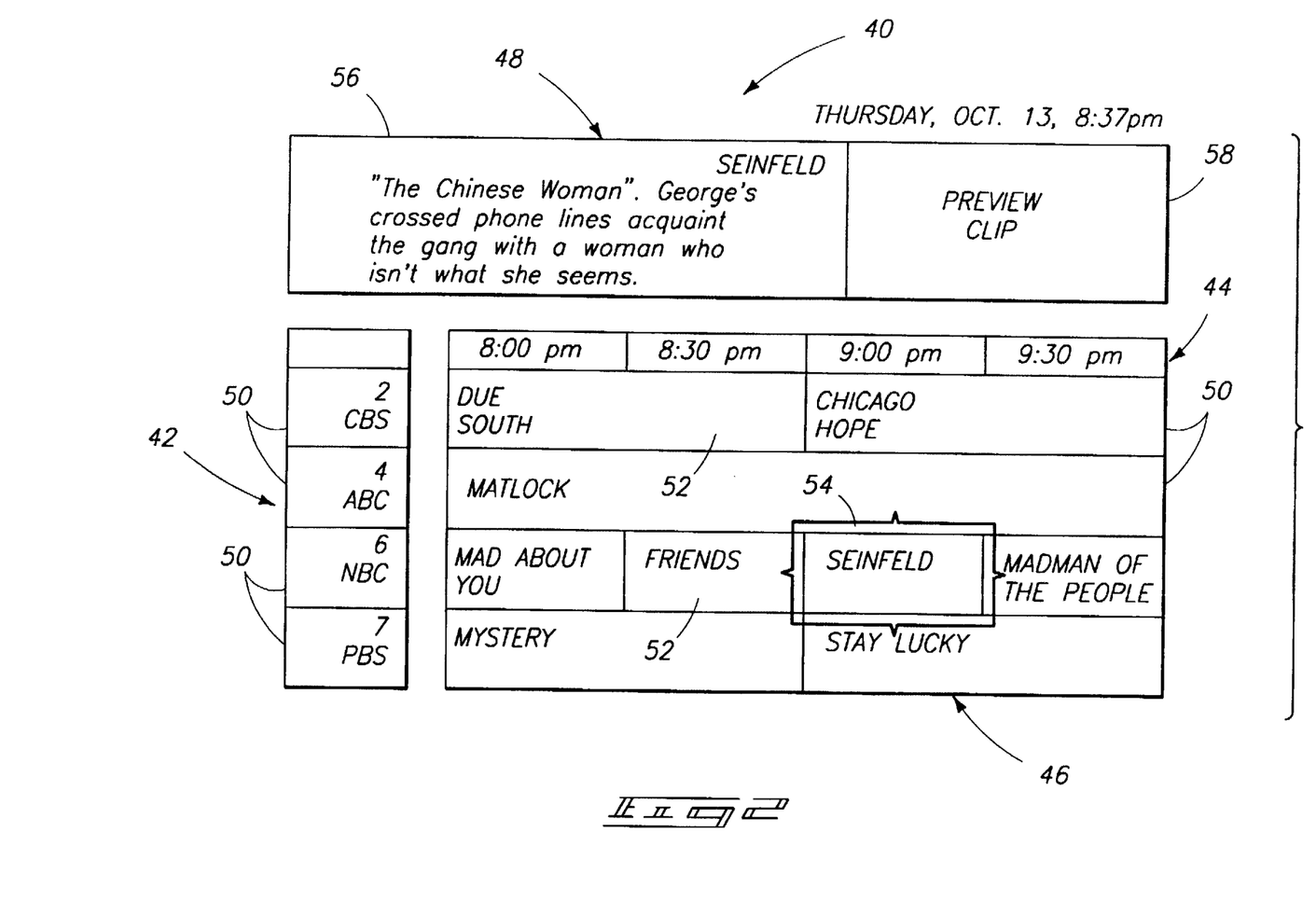
FIG. 2 is an example screen illustration of an electronic programming guide.

FIG. 2 shows an example screen display 40 of an EPG. The EPG screen display 40 includes a channel panel 42, a time panel 44, a program grid 46, and a program summary panel 48. Channel panel 42 provides a vertical scrolling list which displays four channel tiles 50 at any one time. Each channel tile 50 includes a channel number and a channel name (typically the network name, such as CBS and ABC), and might also include a channel logo. The channel panel 42 defines four rows of program titles in program grid 46. Time panel 44 is a horizontal scrolling list of half-hour time segments. Time panel 44 defines columns in program grid 46.

Program grid 46 consists of multiple program tiles 52 organized in channel-based rows and time-based columns. It is located to the right of the channel panel 42 and below the time panel 44. Each program tile 52 has the program title and any secondary program descriptive information, such as closed caption, stereo, etc. The illustrated screen shows an example programming line-up for 8:00 pm to 10:00 pm PST, Thursday, Oct. 13, 1994. The program titles, such as "Due South" and "Matlock", are arranged horizontally with their respective networks CBS and ABC and vertically with respect to their start times of 8:00 pm PST.

The viewer controls the program selection with a single focus frame 54 which is graphically overlaid on the program grid 46. Focus frame 54 can be moved up or down within a time slot, or left and right within a channel line-up, to choose a desire program. A remote control handset, a touch control panel on the set-top box, or other manipulating mechanism can be used to position the focus frame 54. This implementation is preferable, although other types of program selectors may be used to identify and choose a program for display on the television.

Program summary panel 48 includes a text description window 56 and a preview window 58. The text description window 56 displays program information related to the program that is highlighted by the focus frame 54 in program grid 46. Here, the NBC program "Seinfeld" is highlighted. The text description window 56 lists the program title "Seinfeld", and a program description of the current episode. The text description window 56 might also include other program related information, like closed caption, stereo, etc. The preview window 58 is used to display clips of the selected highlighted show.

According to one aspect of this invention, the electronic programming guide 40 can be manipulated to display current programming line-ups, past programming line-ups, and future programming line-ups. FIG. 2 shows a current programming line-up which includes a listing of current programs that are presently being run, and of very near future programs that will play within one to two hours. To display a past programming line-up of previously played past programs, the programming grid 46 is scrolled backward in time (i.e., to the left in the drawing). To display a future programming line-up of upcoming future programs, the programming grid 46 is scrolled forward in time (i.e., to the right in the drawing). The program information used to fill the channel panel 42, the time panel 44, the program grid 46, and the program summary panel 48 is supplied by head end server 22, as is described below in more detail.

The EPG has other on-screen display formats. For instance, the EPG might group program titles according to their content, such as sports or dramas. The EPG can also be configured to use techniques other than, or in addition to, scrolling to locate the desired program title. One example technique is to provide for key word searching that allows the viewer to identify a particular show. Once identified, the EPG would immediately display the relevant program grid pertaining to that show.

With reference again to FIG. 1, centralized head end server 22 provides the multiple different channels of programs to the set-top box and EPG within each home. The programs are embodied as video data streams that are transmitted from head end server 22 over distribution structure 30 to homes 24a–24d. The head end server receives the video signals from another source, such as a satellite feed or other cable system. The video signals are first decoded by decoder 60 to extract the video information. The extracted video information is then reconfigured into the appropriate video data stream by real-time encoder 62. The real-time video data stream is transferred to an amplifier 64 and transmitted by transceiver 66 over distribution structure 30 to homes 24a–24d.

Head end server 22 includes two servers: a continuous media server 68 and a database server 70. Continuous media server 68 is operatively coupled to real-time encoder 62 to record and store the video data streams. Continuous media server 68 includes a program storage 72 to store the video data streams provided by encoder 62. The program storage is preferably embodied as a disk array storage subsystem as shown in FIG. 3.

Figure 3:
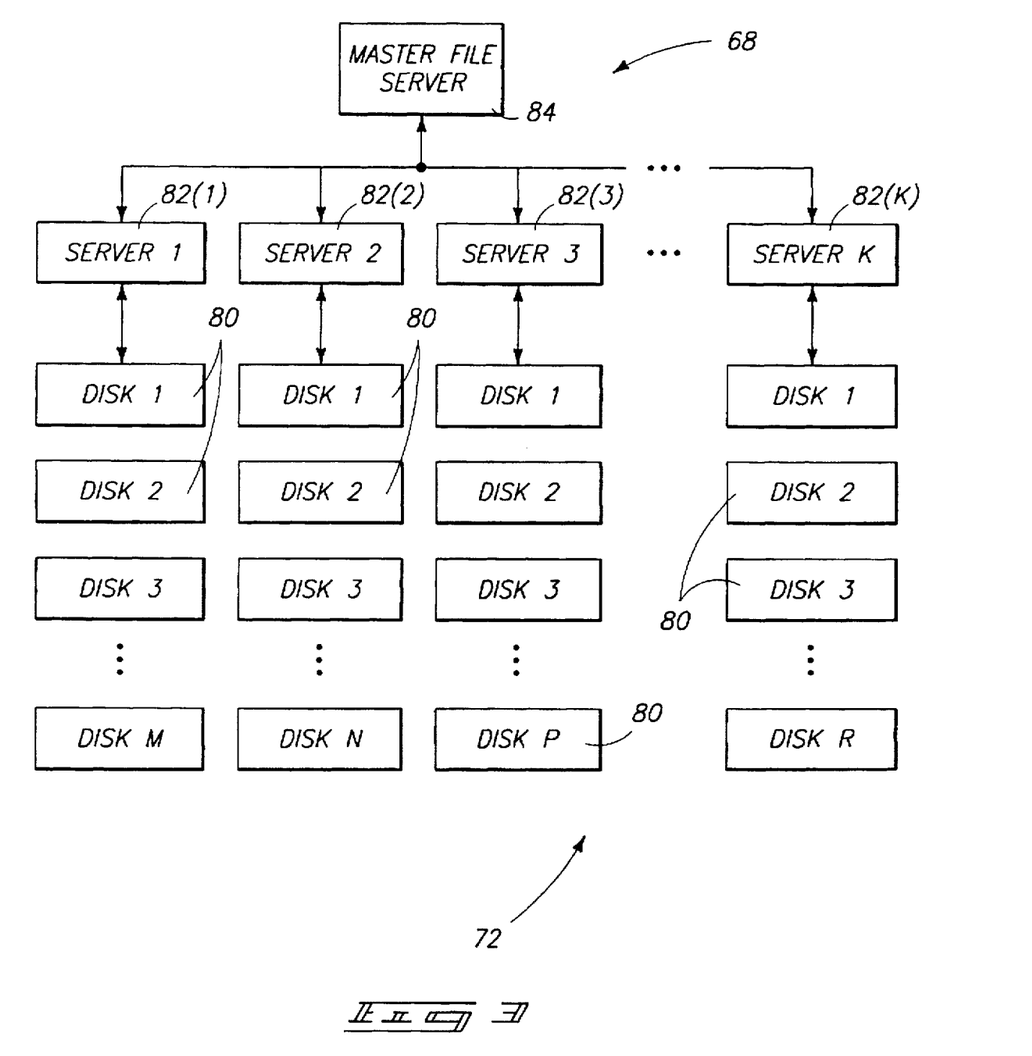
FIG. 3 is a block diagram of a continuous media server according to an aspect of this invention.

FIG. 3 shows a preferred construction of continuous media server 68, and more particularly, the program storage 72 of the continuous media server. Program storage 72 includes K sets of multiple storage disks 80. The storage disks are individually of high capacity, with example sizes of one to several Gigabytes each. Today, a video data stream for a one hour program uses approximately one Gigabyte of storage space, and thus many large capacity storage disks are employed to provide a sufficient reserve of previously played past programs.

Each set is connected to a dedicated server, referenced generally by numeral 82. The first server 82(1) is connected to control data flow to a set of M storage disks. The Kth server 82(K) is connected to control data flow to a set of R. storage disks. A master file server 84 coordinates and controls the dedicated servers 82(1), 82(2), . . . . , 82(K).

The video data streams are stored digitally on the storage disks in predetermined or mapped locations. Preferably, the video data streams are stored redundantly according to mirror or parity techniques, with mirror redundancy being most preferred. In this manner, the video data streams are duplicated on parallel sets of disks to ensure that a copy of the video data stream is available in the event one set of disks fails. The locations of the video data streams are kept in a map and each video data stream can be accessed through pointers to the particular disk location.

In addition to storing video data streams of previously played programs, the continuous media server can also be used to store video preview clips of upcoming future programs. It is common for broadcasting companies to release promotional clips of future television shows. These clips can also be sent to the head end server and stored in the continuous media server for possible recall by a viewer.

The disk array storage subsystem allows the continuous media server to service the simultaneous requests from hundreds of thousands of homes. The digitally stored video data streams can be accessed by any number of users at the same or staggered times. For example, one household might request a video data stream at 8:00 pm, and a second household might request the same video data stream at 8:02 pm. This situation is easily accommodated by staggered pointers to the same video data stream beginning at the same memory location.

Figure 4:
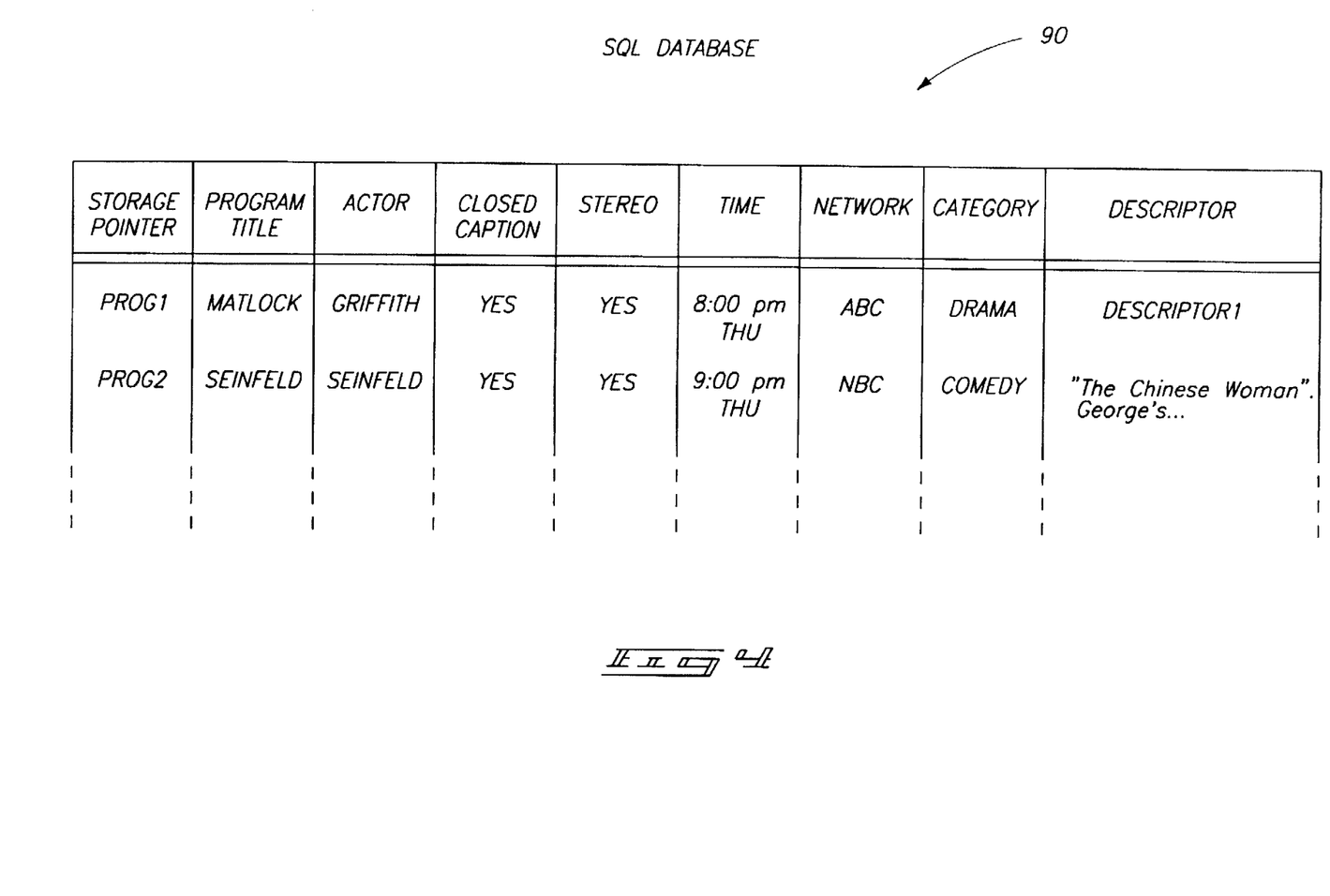
FIG. 4 is a diagrammatic illustration of an SQL database according to another aspect of this invention.

With reference to FIG. 1, database server 70 includes a standard query language (SQL) database 90 that stores the program descriptive information used by the EPG to fill in the various panels and grid. FIG. 4 shows a representative sample of program information kept by SQL database 90. The SQL database stores the program title, actor information, whether the program has closed caption or stereo, the scheduled viewing time, the network name, the program category, and description text. The program information is used by the EPG as the user scrolls through the grid. For instance, the program title and scheduled viewing time stored in SQL database 90 are used to fill respectively the program tiles 52 of program grid 46 and the time panel 44 (FIG. 2).

The SQL database also holds pointers to locations within the disk array storage subsystem of continuous media server 68. The pointers identify the storage locations of the video data streams of the program that corresponds to the information listed in the SQL database. For instance, pointer PROG2 will be used to reference the storage location of the "Seinfeld" program once it is recorded in the program storage. The pointers are used by the EPG to access and display past programs, or previews of future programs, as is described below in more detail.

The interactive television system of this invention enables a viewer with unrestricted flexibility to choose current programs, past programs that have already been run, or previews of upcoming future programs. The EPG is used to scroll to current, past, or future programs. The user selects the desired program title from the depicted program grid.

If the selected program title corresponds to a current program, the real-time video data stream transmitted from head end server is displayed on the television. If the program title from the EPG grid corresponds to a past program, the set-top box requests a previously played program. The head end server retrieves the video data stream of the past program from program store 72 and transmits it to the requesting set-top box for display. If the selected program title corresponds to a future program, the head end server retrieves a video preview clip of the upcoming future program from program store 72 and transmits it to the viewer's set-top box.

Figure 5:
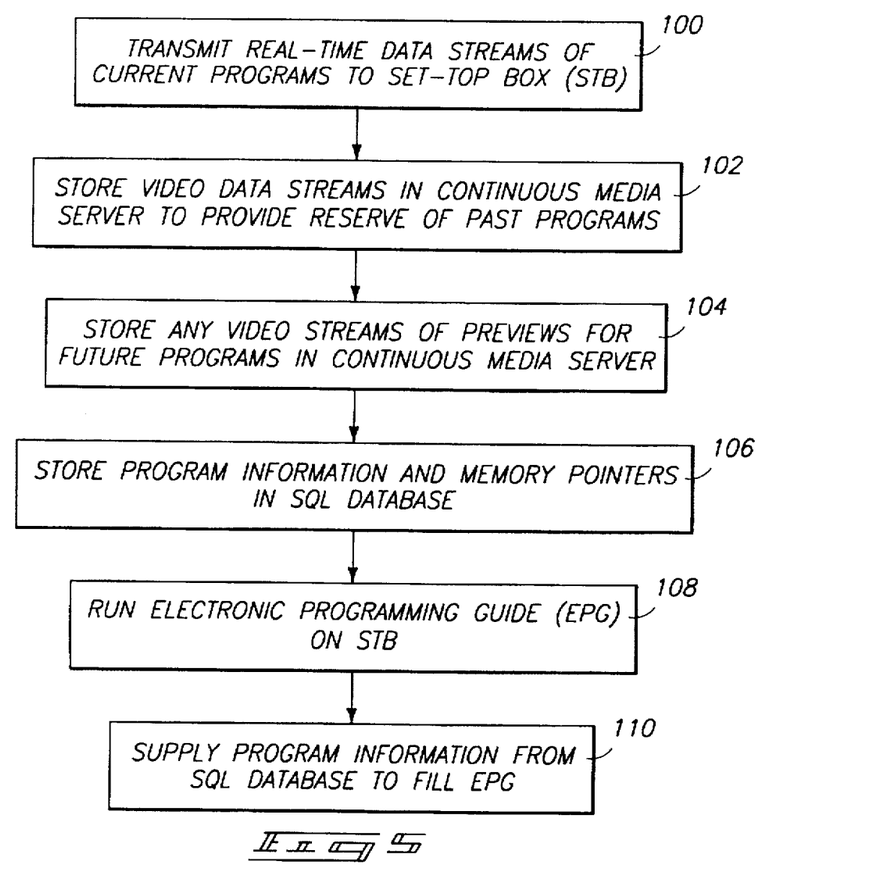
FIG. 5 is a flow diagram of a preferred method for operating the interactive television system.

FIG. 5 shows the general operational method of the interactive television system. The listed steps are provided in the illustrated order for purposes of discussion, but no particular order should be presumed. More accurately, all of the steps are occurring continuously and simultaneously.

A real-time video data stream encoded by encoder 62 is amplified and transmitted from head end server 22 to set-top boxes (STB) 24a–24d (step 100). The real-time video data streams provide all of the current programs available on the cable system, as is conventionally done. At this time, the video data streams of the current programs are stored in program storage 72 of continuous media server 68 to provide a reserve of past programs (step 102). Any video preview clips of future programs are also stored in the continuous media server (step 104).

The program information (e.g., program title, scheduled viewing time, closed caption, etc.) is stored the SQL database 90 (step 106). The EPG is run on the individual STBs 26a–26d so that each viewer is presented with their own controllable, manipulable on-screen program grid (step 108). As the viewer scrolls the EPG screen backward or forward, up or down, the STB sends an SQL inquiry back to head end server 22. The SQL database 90 then supplies the program information used to fill in the panels and grid (step 110).

Figure 6:
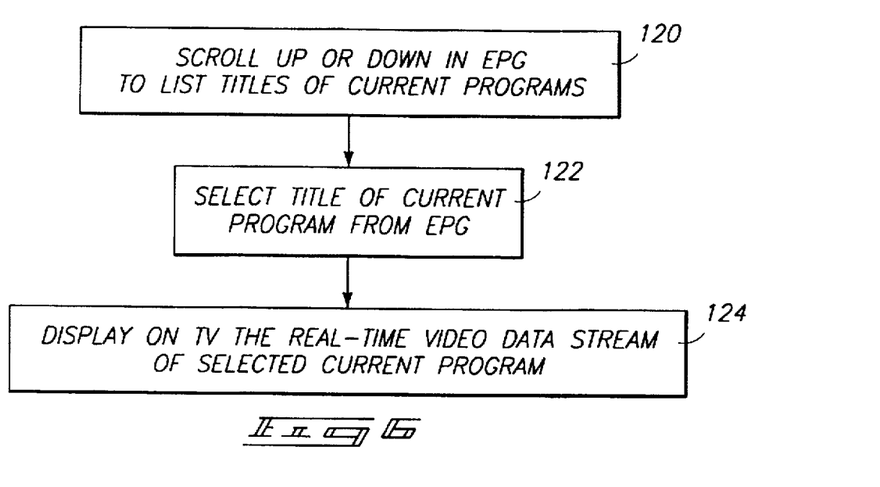
FIG. 6 is a flow diagram of a preferred method for choosing to view a current program.
Figure 8B:
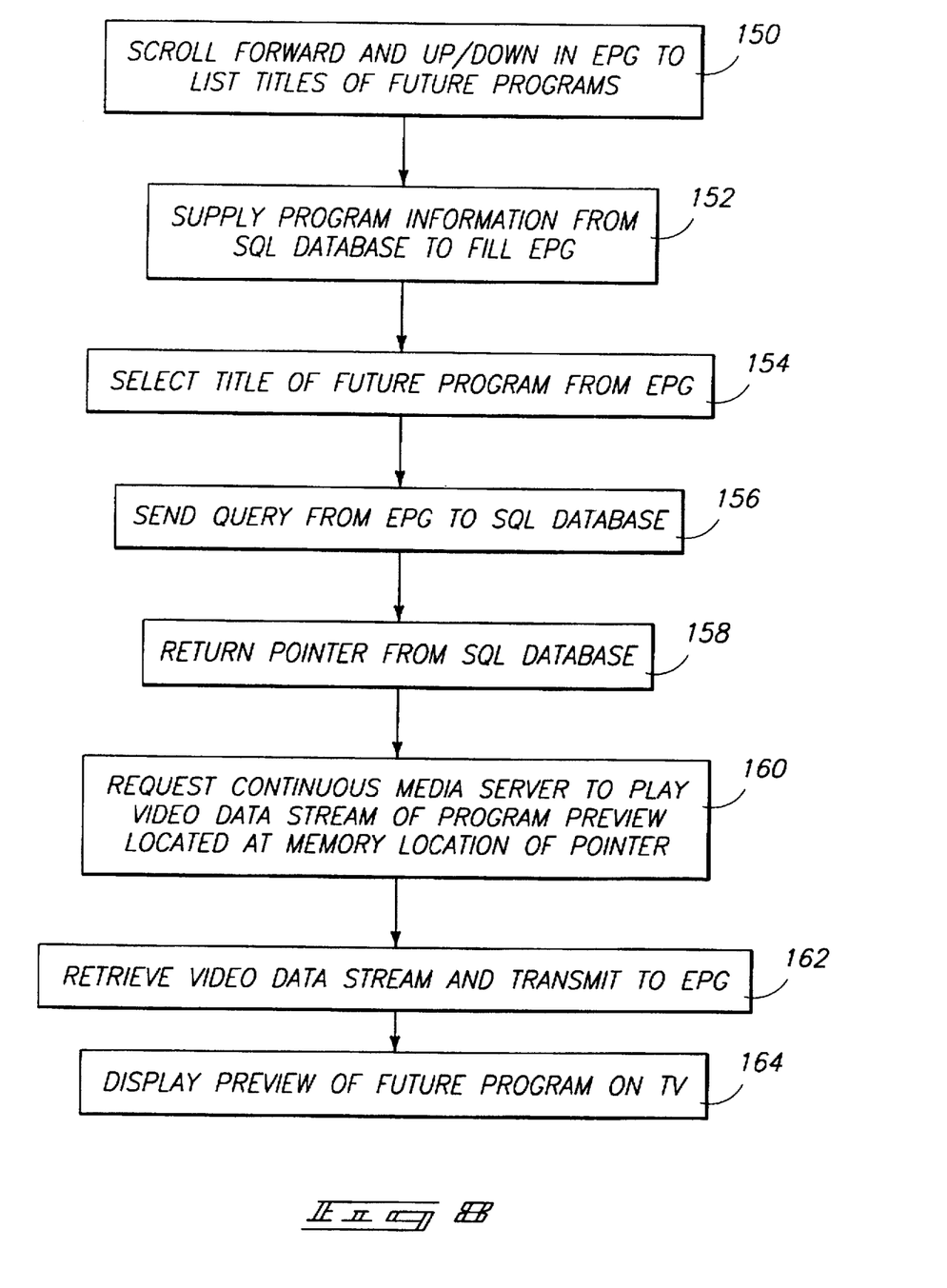
FIG. 8 is a flow diagram of a preferred method for choosing to view a preview of a future program.
Figure 11:
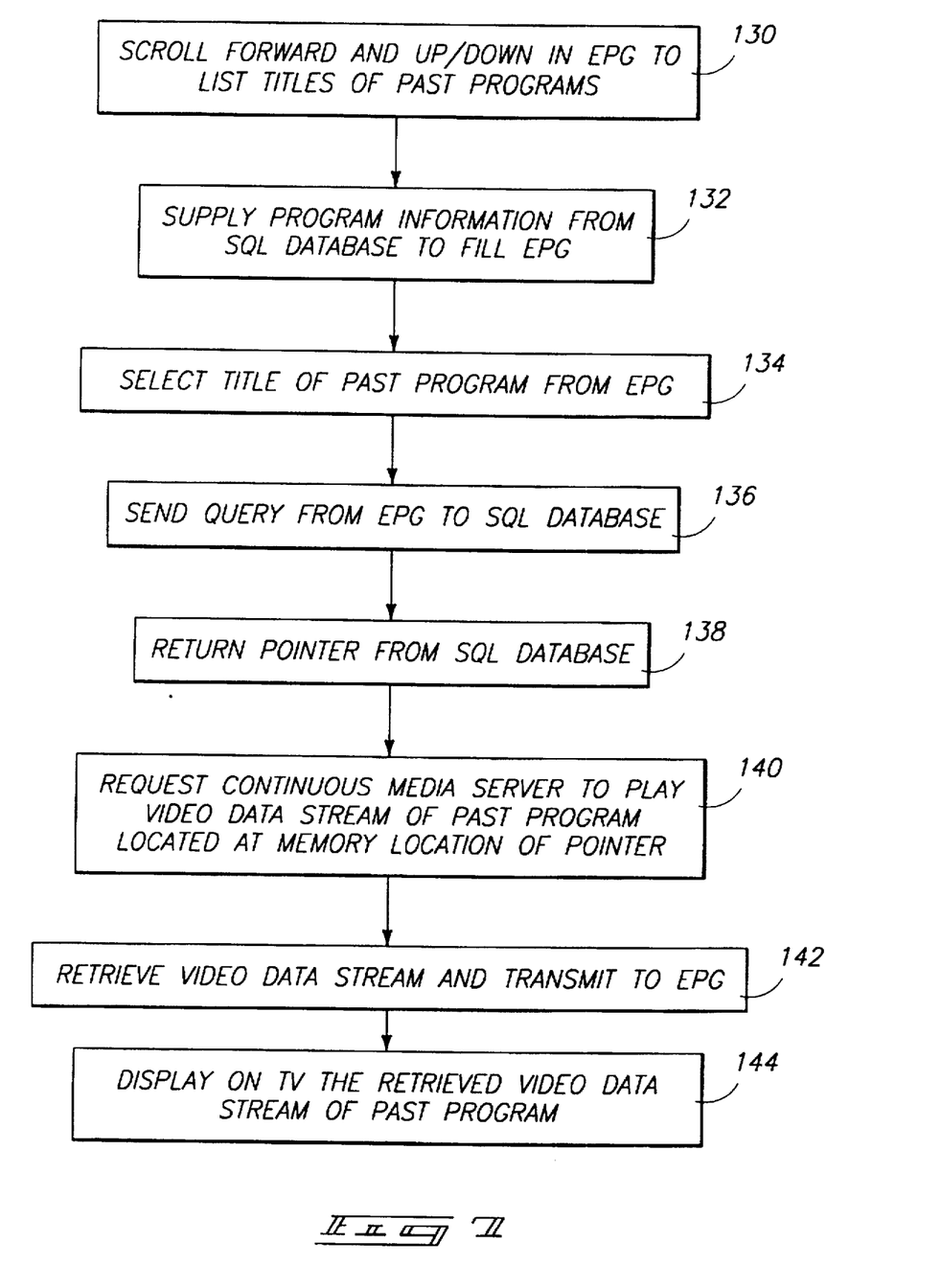

FIGS. 6–8 depict various processes of this invention concerning viewer selection of current, past, and future programs. FIG. 6 shows the process when a viewer selects a current program. The viewer scrolls up and down within the current time period of the program grid 46 (FIG. 2) to view the various program titles available at the present time (step 120). The viewer moves the focus frame to the desired program tile and selects it (step 122). For instance, suppose the viewer selected "Seinfeld" as demonstrated in FIG. 2. The real-time video data stream pertaining to "Seinfeld" from head end server 22 is then immediately displayed on the television (step 124).

FIG. 7 shows a preferred process when a viewer selects a past program. The viewer scrolls backward in the program grid (to the left in FIG. 2) to list previously played shows, and up and down to list different channels (step 130). For instance, suppose a viewer wanted to watch the "Frasier" episode on Tuesday, October 11, two nights before the currently running programming of October 13. The viewer would scroll back to Tuesday, October 11, 9:00 pm PST, and then up or down to the NBC channel to find a listing of "Frasier". During the scrolling, the relevant information to fill in the channel panel, time panel, program summary panel, and program grid are supplied from SQL database in response to SQL queries sent by the set-top box (step 132). The viewer can then select the highlighted program title in the EPG (step 134). The EPG sends an SQL inquiry to the SQL database 90 requesting the selected "Frasier" show (step 136). The SQL database returns a pointer to the location at which the video data stream of "Frasier" is stored in program storage 72 (step 138).

The EPG then passes the pointer to the continuous media server 68 and requests it to access the "Frasier" video data stream (step 140). The continuous media server retrieves the video data stream from the disk array storage subsystem, and transmits it to the requesting EPG (step 142). The video data stream of the previously played "Frasier" episode is then displayed on the television (step 144).

Because the video data stream is being retrieved directly from digital storage, the viewer can manipulate the video data stream as desired in a manner similar to controlling conventional VCR systems. For example the viewer can fast forward, pause, replay, etc. any portion of the "Frasier" episode.

It is further noted that a combination of viewing current and past programs can be employed. For instance, suppose a viewer is watching the real-time video data stream of the current "Seinfeld" program, but is distracted during the middle portion of the show. The viewer could simply "rewind" to the point at which they were distracted and replay it. The viewer is not really rewinding the show, in the sense of a VCR cassette, but instead is changing from the real-time video data stream of the current "Seinfeld" program to the stored video data stream of the earlier segment of the same "Seinfeld" program. The viewer will be able to scan the stored segment and catch up to the real-time video data stream. The possibilities afforded by this fully interactive television system offer tremendous flexibility and control to the viewer.

FIG. 8 shows a preferred process when a viewer selects a future program. The process is very similar to the process of selecting past programs, as described above with respect to FIG. 7. Because the future programs are not yet available, however, the viewer is permitted to see only a preview of the upcoming program. The viewer scrolls forward, and up/down, in the program grid (i.e., to the right in FIG. 2) to list upcoming future shows (step 150). Suppose a viewer wanted to watch a preview of the upcoming football game to be played on Saturday, October 15, two days after the current time on October 13. The viewer would scroll forward to Saturday, October 15, 12:30 pm PST, and then up or down to find the appropriate sports channel. As above, the program information to fill the grid is supplied by SQL database 90 (step 152).

The viewer selects the highlighted program title in the EPG (step 154) and the EPG sends an SQL inquiry to the SQL database 90 requesting the selected football show (step 156). The SQL database returns a pointer to the location at which the video preview clip of the football game is stored in program storage 72 (step 158).

The EPG passes the pointer to the continuous media server 68 and requests access to the video preview clip (step 160). The continuous media server retrieves the video preview clip from the disk array storage subsystem, and transmits the clip to the requesting EPG (step 162). The video preview clip of the upcoming football game is then displayed on the television, preferably within preview window 58 of program summary panel 48 while the programming grid 46 remains visible (step 164).

The interactive television system of this invention affords the convenience of an on-screen electronic programming guide and the flexibility of video on demand service. The EPG allows the viewer to intuitively scroll through past, current, or future programs and select a desired show. If the show is currently being played, the real-time video data stream is display. On the other hand, if the a past or future program is selected, the interactive television system provides video data streams or preview clips on demand.

In compliance with the statute, the invention has been described in language more or less specific as to structural and methodical features. It is to be understood, however, that the invention is not limited to the specific features shown and described, since the means herein disclosed comprise preferred forms of putting the invention into effect. The invention is, therefore, claimed in any of its forms or modifications within the proper scope of the appended claims appropriately interpreted in accordance with the doctrine of equivalents.

We claim:

1. An interactive television system comprising:
   a set-top box configured to control which programs are displayed on a television, the set-top box providing an electronic programming guide for display on the television, the electronic programming guide providing an on-screen listing of various program titles correlated to corresponding scheduled viewing times;
   a head end server operatively coupled to provide past and current programs to the set-top box for display on the television, the head end server further providing the program titles and scheduled viewing times of the past, current, and future programs to the electronic programming guide;
   the electronic programming guide being manipulable to list titles and scheduled viewing times of the past, current, and future programs;
   a program selector to choose a title of a past program, a title of a current program, or a title of a future program from the electronic programming guide; and
   the head end providing (1) a reproduced video data stream of the past program if the title of the past program is selected, (2) a real-time video data stream of the current program if the title of the current program is selected, or (3) a video data stream of a preview of the future program if the title of the future program is selected.

2. An interactive television system according to claim 1 wherein the head end server includes a disk array storage subsystem that digitally stores the past programs for reproduction on demand.

3. An interactive television system according to claim 1 wherein the head end server includes a database that maintains the program titles and scheduled viewing times for the current and past programs that are used in the electronic programming guide.

4. An interactive television system according to claim 1 wherein the head end server includes:
   a disk array storage subsystem that digitally stores the past programs for reproduction on demand; and
   a database that maintains the program titles and scheduled viewing times for current and past programs that are used in the electronic programming guide, the database also holding pointers to locations for accessing the past programs stored on the disk array storage subsystem.

5. An interactive television system comprising:
   multiple set-top boxes, independent set-top boxes being configured to control which programs are displayed on an associated television, each set-top box providing an electronic programming guide for display on its associated television, the electronic programming guide providing an on-screen listing of various program titles correlated to corresponding scheduled viewing times;
   a head end server remotely located from, but coupled to serve, the multiple set-top boxes;
   a database resident at the head end server, the database supplying the program titles and scheduled viewing times of past, current, and future programs to the electronic programming guide;

a continuous media server resident at the head end server, the continuous media server having a disk array storage subsystem that stores the past programs and previews of the future programs;

the database also holding pointers to locations within the disk array storage subsystem for accessing associated past programs and previews of the future programs;

upon selection of a past program, the database providing a pointer to a memory location in the disk array storage subsystem that is associated to the selected past program, the continuous media server using the pointer to retrieve a video data stream of the selected past program and supplying the video data stream to the set-top box;

upon selection of a current program, the head end server supplying a real-time video data stream of the current program to the set-top box; and upon selection of a future program, the database providing a pointer to a memory location in the disk array storage subsystem that is associated to the selected future program, the continuous media server using the pointer to retrieve a video data stream of the preview of the future program and supplying the video data stream to the set-top box.

6. An interactive system comprising:

an electronic programming guide configured to display various program titles in correlation with corresponding scheduled viewing times for past, current, and future programs, the electronic programming guide being manipulable to select the program titles of the past, current, and future programs;

a program storage operatively coupled to supply, in response to selections from the electronic programming guide, the past programs and previews of the future programs;

upon selection of a particular past program from the electronic programming guide, the program storage supplying a video data stream of the particular past program; and upon selection of a particular future program from the electronic programming guide, the program storage supplying a video data stream of a preview of the future program.

7. An interactive system according to claim 6 wherein the electronic programming guide is executed in a set-top box, and the program storage is resident at a content provider operatively couplable to, but remote from, the set-top box.

8. An interactive system according to claim 6 wherein the program storage comprises a disk array storage subsystem.

9. An interactive system according to claim 6 further comprising a database to hold pointers to locations within the program storage that correspond to the video data streams.

10. A method for calling video on demand using an electronic programming guide which correlates various program titles in relation to corresponding scheduled viewing times of past programs, current programs, and future programs, the method comprising the following steps:

selecting a program title in the electronic programming guide;

in the event that the selected title relates to a current program, displaying a real-time video data stream of the current program;

in the event that the selected title relates to a past program, displaying a previously stored video data stream of the past program; and in the event that the selected title relates to a future program, displaying a video data stream of a preview of the selected future program.

11. A method according to claim 10 further comprising the step of storing the video data streams of past programs, which are indicated on the electronic programming guide as being previously played, on a disk array storage subsystem.

12. A method according claim 10 wherein the step of selecting includes scrolling the electronic programming guide until a desired program title of a past or current program is listed.

13. A method according claim 10 further comprising the following additional steps:

storing the program titles and scheduled viewing times in a database; and supplying the program titles and scheduled viewing times from the database to the electronic programming guide.

14. A computer-readable medium having computer-readable instructions for performing the steps in the method as recited in claim 10.

15. A method for operating an interactive television system, the method comprising the following steps:

providing an electronic programming guide for display on a television, the electronic programming guide listing various program titles in relation to corresponding scheduled viewing times of past, current, and future programs;

storing video data streams of previews of upcoming future programs in a continuous media server;

storing, in a database, pointers to locations of the video data streams in the continuous media server;

storing the program titles and scheduled viewing times in the database;

supplying the program titles and scheduled viewing times from the database to the electronic programming guide;

manipulating the electronic programming guide to display the program titles of the future programs whereby during said manipulating, the program titles and scheduled viewing times of the future programs to be displayed are supplied from the database;

selecting a program title of a future program listed in the electronic programming guide;

sending a query from the electronic programming guide to the database regarding the selected future program;

returning from the database a pointer to a location in the continuous media server of a video data stream corresponding to the selected future program;

retrieving the video data stream of the preview of the selected future program from the continuous media server; and displaying on the television the preview of the selected future program.

16. A method according claim 15 wherein the step of storing video data streams comprises digitally storing the video data streams on a disk array storage subsystem within the continuous media server.

17. A method according claim 15 wherein the step of manipulating includes scrolling the electronic programming guide to display the program titles and viewing times of the future programs.

18. A method according claim 15 wherein the step of displaying comprises displaying the preview of the selected future program within a viewing window while simultaneously displaying the electronic programming guide.

19. Computer-readable media having computer-readable instructions for performing the steps in the method as recited in claim 15.

20. In an interactive system in which a content provider serves content to a display unit, an electronic programming guide that executes at the display unit to correlate content titles to scheduled viewing times for past, current, and future content, the electronic programming guide being manipulable to select the past, current, and future content so that upon selection of (1) past content, the display unit displays content which has been previously stored, (2) current content, the display unit displays content in real-time, and (3) future content, the display unit displays a preview of the future content.

* * * * *